United States Patent [19]

Hostetter

[11] 4,456,075
[45] Jun. 26, 1984

[54] WEEDING AUGER WITH U-SHAPED BLADE

[76] Inventor: John L. Hostetter, Rte. 3, Box 385-A, Mountain Home, Ark. 72653

[21] Appl. No.: 469,397

[22] Filed: Feb. 24, 1983

[51] Int. Cl.³ .............................................. A01B 1/16
[52] U.S. Cl. ..................................... 172/25; 172/372; 172/381; 30/310; 175/382; 175/385; 175/398; 294/50.6
[58] Field of Search ............... 172/371, 372, 376, 25, 172/381; 254/131.5, 132; 294/50.5, 50.6, 50.7, 53.5; 7/114, 116; 30/310, 276, 300; 175/382, 385, 398, 408

[56] References Cited

U.S. PATENT DOCUMENTS

| | | | |
|---|---|---|---|
| 128,150 | 6/1872 | Johonnott | 254/131.5 |
| 445,621 | 2/1891 | Kretsinger | 254/131.5 |
| 799,359 | 9/1905 | Shaffer | 172/25 |
| 1,142,783 | 6/1915 | Eagan | 254/131.5 |
| 1,528,157 | 3/1925 | Leyden | 294/50.6 |
| 1,842,903 | 1/1932 | Falk | 30/310 X |
| 1,857,500 | 5/1932 | Davison | 254/132 |
| 1,947,785 | 2/1934 | Lipscomb | 30/310 |
| 2,504,746 | 4/1950 | Stecker et al. | 254/132 |
| 3,522,850 | 8/1970 | Pede | 172/376 |
| 3,548,497 | 12/1970 | Bickett | 30/300 |
| 3,548,953 | 12/1970 | Richardson, Sr. | 172/41 |
| 4,003,436 | 1/1977 | Foster et al. | 172/41 |
| 4,122,902 | 10/1978 | Alexander | 172/41 |

FOREIGN PATENT DOCUMENTS

| | | | |
|---|---|---|---|
| 57390 | 3/1940 | Denmark | 254/132 |
| 577620 | 6/1933 | Fed. Rep. of Germany | 172/385 |
| 842871 | 7/1960 | United Kingdom | |

Primary Examiner—Richard T. Stouffer
Attorney, Agent, or Firm—Harvey B. Jacobson

[57] ABSTRACT

An elongated upstanding shank is provided including a ground piercing lower end and an upper end including structure for applying rotary torque to the shank. The lower end portion of the shank supports a generally horizontally disposed U-shaped blade therefrom including a pair of generally parallel upper and lower arms joined at one pair of corresponding ends by an integral curved bight portion. The other pair of corresponding ends of the arms are supported from the shank at points spaced therealong. At least the lower arm and the adjacent portion of the bight portion include a sharpened edge facing outwardly of one side of an upstanding plane containing the U-shaped blade and the shank. The blade comprises a thick elongated strap metal member bent into U-shaped configuration and the portions of the blade defining the lower arm and the adjacent portion of the bight portion are disposed with their width extents disposed generally normal to the aforementioned plane. The portion of the strap metal member defining the juncture between the upper arm and the adjacent upper portion of the bight portion has a substantially 90° twist formed therein with the base end portion of the upper arm remote from the bight portion being reversely bent upon itself to define a sleeve through which the shank is received and removably secured.

11 Claims, 5 Drawing Figures

U.S. Patent  Jun. 26, 1984  4,456,075
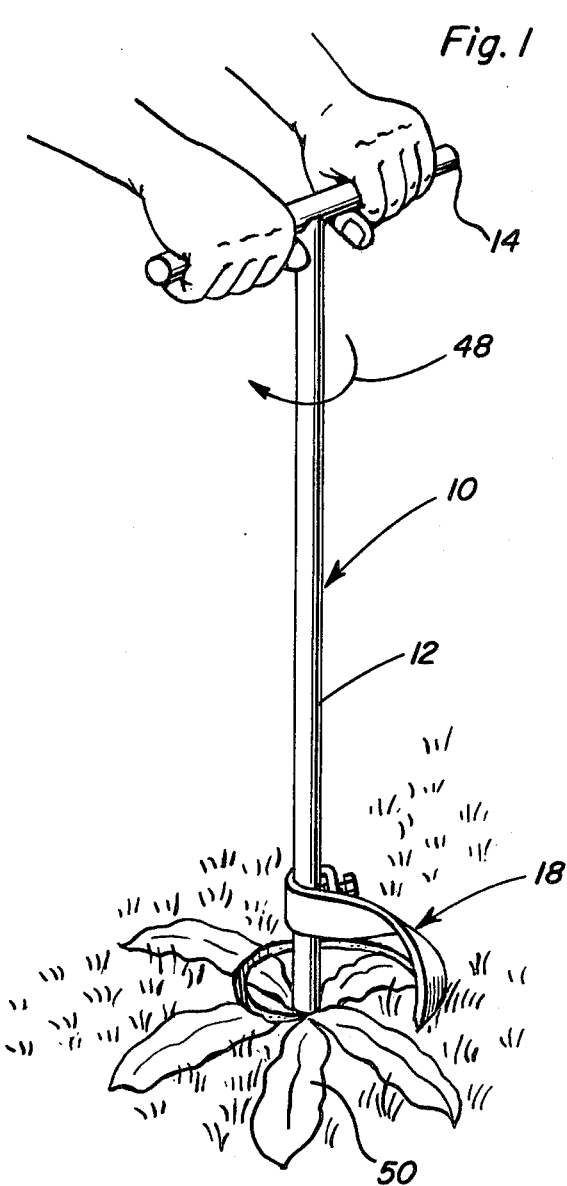
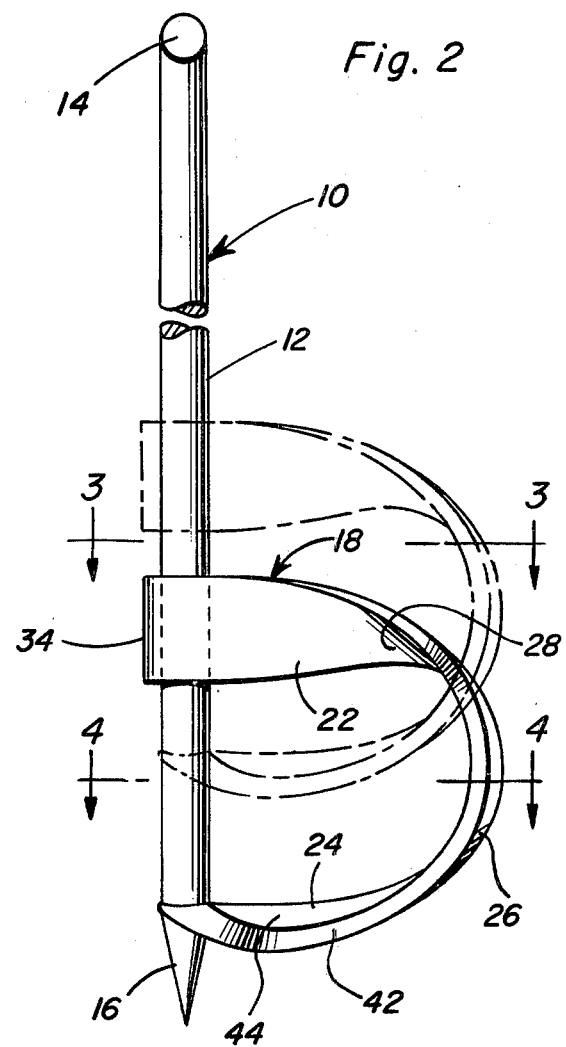
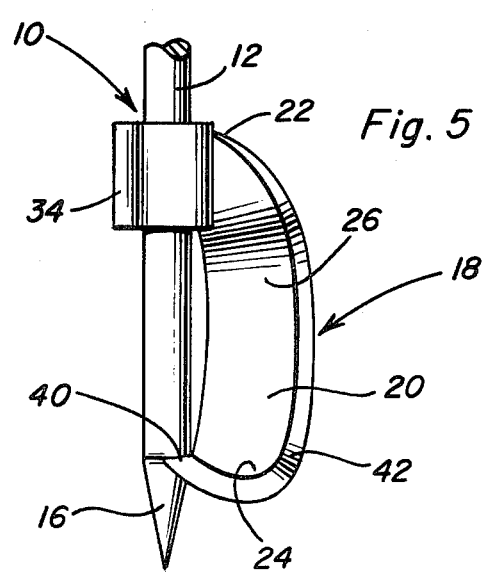
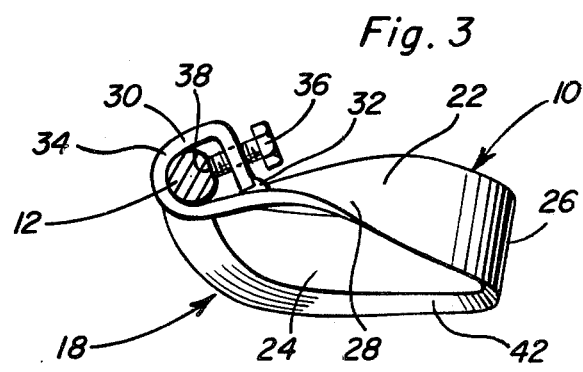
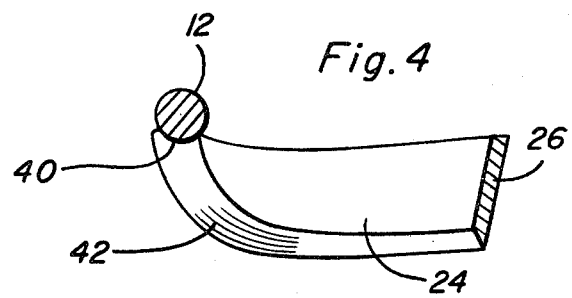

WEEDING AUGER WITH U-SHAPED BLADE

BACKGROUND OF THE INVENTION

It is often necessary to singly remove weeds from lawn areas and small garden plots and weed removal by pulling and through the use of conventional weed digging tools sometimes is ineffectual inasmuch as sufficient portions of the weeds are left in the ground to enable regrowth in a short time. In addition, when gardening it is often necessary to loosen soil around the shrubs or to dig small holes for receiving plants and shrubs being set out. Accordingly, a need exists for a weed removal tool which may be effectual to remove an entire weed and which also may be used for loosening soil about shrubs and plants and for forming small holes in which to plant small shrubs and starter plants.

Examples of various types of weed removal tools and other similar structures including some of the general structural and operational features of the instant invention are disclosed in U.S. Pat. Nos. 1,153,721, 1,951,978, 2,018,297, 2,028,483, 2,164,373, 2,860,001 and 3,173,495. However, these previously known tools are not capable of performing all of the intended functions of the instant invention.

BRIEF DESCRIPTION OF THE INVENTION

The weeding auger of the instant invention includes a main upright support shank having a T-handle or crosshead at its upper end whereby rotary torque may be applied to the shank. The lower end of the shank includes a generally horizontal U-shaped strap member blade including upper and lower generally parallel arms interconnected at one pair of ends by an integral U-shaped bight portion and supported at the other pair of corresponding ends from vertically spaced portions of the lower end portion of the shank. The lower arm and adjacent portion of the bight portion include a continuous sharpened edge which faces in one direction of rotation of the shank and the upper portion of the bight portion and the adjacent outer end of the upper arm include a 90° twist whereby the base end of the upper arm supported from the shank is disposed in a plane containing the U-shaped blade and the shank member. The terminal end of the base end of the upper arm is reversely bent back upon itself to form a sleeve through which the shank is received and the sleeve includes a setscrew for clamped engagement with the shank. The 90° twist in the upper portion of the U-shaped blade not only facilitates attachment of the base end of the upper arm of the blade to the shank but also twists the base end portion of the blade to a position disposed transverse to the direction in which the blade is rotated during use of the weeding tool and thus defines a yieldable limit of downward movement of the auger into the ground and enables the soil downwardly through which the auger is advanced to be more thoroughly crumbled and rendered suitable for immediate planting of a starter flower or shrub.

The main object of this invention is to provide a multipurpose tool which may be used not only for weeding but also for ground loosening about shrubs and plants and further for forming holes in which flowers and shrubs may be planted.

Another object of this invention is to provide a tool in accordance with the preceding object enabling the desired earth working operations to be carried out by a person disposed in a standing position.

Still another object of this invention, is to provide a weeding tool which may be used effectively on different types of weeds.

Yet another important object of this invention is to provide a weeding tool which may be utilized for digging holes in which to receive flowers and shrubs being planted and which is operative to substantially fully condition the soil within the hole being formed preparatory to planting of the desired flowers or shrubs.

A final object of this invention to be specifically enumerated herein is to provide a weeding tool in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the weeding tool in the process of being utilized to dig a weed from a lawn area;

FIG. 2 is a fragmentary enlarged side elevational view of the weeding tool with an intermediate length portion of the shank thereof broken away and an alternate vertically adjusted position of the blade of the weeding tool illustrated in phantom lines;

FIG. 3 is a horizontal sectional view taken substantially upon the plane indicated by the section line 3—3 of FIG. 2;

FIG. 4 is a horizontal sectional view taken substantially upon the plane indicated by the section line 4—4 of FIG. 2; and FIG. 5 is a fragmentary perspective view of the lower end portion of the weeding tool.

DETAILED DESCRIPTION OF THE INVENTION

Referring now more specifically to the drawings the numeral 10 generally designates the weeding tool of the instant invention. The tool 10 includes an upstanding elongated cylindrical shank 12 provided with a crosshead or T-handle 14 on its upper end portion. The lower terminal end of the shank 12 is pointed as at 16 and a blade assembly referred to in general by the reference numeral 18 is removably supported from the lower end portion of the shank 12 immediately above the pointed lower terminal end 16 thereof.

The blade assembly comprises an elongated thick metal strap member 20 bent into horizontally opening U-shaped configuration including upper and lower arms 22 and 24 interconnected at one pair of corresponding ends by an integral U-shaped bight portion 26. The lower arm 24 and the adjacent portion of the bight portion 26 are disposed with their width extents disposed transverse to a plane containing the blade assembly 18 and the shank 12 and the adjacent portions of the upper arm and bight portion 26 include a 90° twist as at 28 whereby the end of the arm 22 remote from the bight portion 26 is disposed in the plane containing the blade assembly 18 and the shank 12. The base end of the arm 22 adjacent the shank 12 and remote from the bight portion 26 is bent back upon itself as at 30 and secured to the adjacent portion of the arm 22 by welding as at 32. In this manner, a sleeve 34 is defined on the base end portion of the arm 22 through which the shank 12 is slidingly received and the sleeve 34 includes a setscrew 36 which may be tightly threaded against the shank 12 in order to retain the blase assembly 18 in position on the shank 12. Further, the side of the shank 12 against which the setscrew 36 is abutted includes a flat 38.

As may be seen from FIG. 2 of the drawings, the setscrew 36 may be loosened and the vertical positioning of the blade assembly 18 along the shank 12 may be adjusted as desired before the setscrew 36 is again tightened. The inner end of the lower arm 24 is notched as at 40 and the notch 40 seatingly receives the lower end portion of the shank 12. The lower arm 24 and bight portion 26 include a lengthwise continuous sharpened edge 42 and the notched end of the lower arm 24 may be slightly twisted as at 44 so as to define a negative approach angle for facilitating downward movement of the arm 24 into the ground as the tool 10 is rotated in the direction of the arrow 48, see FIGS. 1 and 2.

When a weed such as the weed 50 is to be removed from the ground, the terminal end 16 of the shank 12 may be downwardly displaced through the center or immediately to one side of the center of the weed 50 and the tool 10 may be turned in the direction of the arrow 48 whereby the blade assembly 18 will cut its way down into the ground removing all of the weed 50 and the root system thereof. Of course, the tool 10 may also be used to loosen soil about small plants and shrubs and further to dig small holes in the ground in which to plant flowers or small shrubs.

The base end portion of the upper arm 22, by being disposed in the plane of the blade assembly 18 and shank 12, defines a yieldable limit of downward movement of the blade assembly 18 into the ground. However, if a deeper hole is required or it is desired to more fully pulverize the dirt within the hole being formed, the tool 10 may be further rotated down into the ground in order that the base end portion of the arm 22 may pulverize the soil in the upper portion of the hole which has been formed.

It will of course be noted that the blade assembly 18 may be removed from the lower end of the shank 12 merely by loosening the setscrew 36 and sliding the blade assembly 18 from the lower end of the shank 12. In this manner, the cutting edge 42 may be readily resharpened when resharpening is required without interference by the shank 12.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A weeding auger including an elongated upstanding shank having a ground piercing lower end and an upper end including structure for applying rotary torque to said shank, the lower end portion of said shank supporting only a single generally horizontally disposed U-shaped blade therefrom including a pair of generally parallel upper and lower arms joined at one pair of corresponding ends by an integral curved bight portion the other pair of corresponding ends of said arms being supported from said shank at points spaced therealong, at least said lower arm and the adjacent portion of said bight portion including a bevelled cutting edge extending lengthwise therealong facing outwardly of one side of an upstanding plane containing said U-shaped blade and said shank, said lower arm including a slight twist so as to define a negative approach angle for facilitating downward movement of the lower arm into the ground.

2. The weeding auger of claim 1 wherein said U-shaped blade comprises a thick elongated strap metal member bent into U-shaped configuration and the portions of said blade defining the lower arm and the adjacent portion of said bight portion are positioned with their width extents disposed generally normal to said plane.

3. A weeding auger including an elongated upstanding shank having a ground piercing lower end and an upper end including structure for applying rotary torque to said shank, the lower end portion of said shank supporting a generally horizontally disposed U-shaped blade therefrom including a pair of generally parallel upper and lower arms joined at one pair of corresponding ends by an integral curved bight portion the other pair of corresponding ends of said arms being supported from said shank at points spaced therealong, at least said lower arm and the adjacent portion of said bight portion including a sharpened edge facing outwardly of one side of an upstanding plane containing said U-shaped blade and said shank, the portion of said strap metal member defining the juncture between said upper arm and the adjacent upper portion of said bight portion having a substantially 90° twist formed therein and the base end portion of said upper arm remote from said bight portion having its width extent generally paralleling said shank.

4. The weeding auger of claim 3 wherein said base end portion of said upper arm is reversely bent back upon itself to define a sleeve portion through which said shank is slidingly received.

5. The weeding auger of claim 4 wherein said sleeve portion includes setscrew means engaging and releasably locking said sleeve portion in position on said shank.

6. The weeding auger of claim 5 wherein the free end of said reversely bent portion is welded to said upper arm.

7. The weeding auger of claim 4 wherein the end of said lower arm remote from said bight portion includes a notch formed therein in which the lower end portion of said shank portion is seatingly received.

8. The weeding auger of claim 7 wherein said sleeve portion includes setscrew means engaging and releasably locking said sleeve portion in position on said shank.

9. The weeding auger of claim 8 wherein the free end of said reversely bent portion is welded to said upper arm.

10. The weeding auger of claim 9 wherein said shank includes a cylindrical outer surface and the side portion thereof engaged by said setscrew means includes a flat against which said setscrew means is abutted.

11. The weeding auger of claim 3 wherein the upper end of said shank includes a crosshead comprising said structure for applying rotary torque to said shank.

* * * * *